US012646159B2

(12) United States Patent
Sakai et al.

(10) Patent No.: US 12,646,159 B2
(45) Date of Patent: *Jun. 2, 2026

(54) SERVER AND OSHIBORI MANAGEMENT SYSTEM

(71) Applicant: FSX, INC., Kunitachi (JP)

(72) Inventors: Yasuyuki Sakai, Tokyo (JP); Taku Watanabe, Kunitachi (JP)

(73) Assignee: FSX, INC., Kunitachi (JP)

( * ) Notice: Subject to any disclaimer, the term of this patent is extended or adjusted under 35 U.S.C. 154(b) by 270 days.

This patent is subject to a terminal disclaimer.

(21) Appl. No.: 18/570,662

(22) PCT Filed: Oct. 7, 2022

(86) PCT No.: PCT/JP2022/037550
§ 371 (c)(1),
(2) Date: Dec. 15, 2023

(87) PCT Pub. No.: WO2023/127224
PCT Pub. Date: Jul. 6, 2023

(65) Prior Publication Data
US 2024/0281950 A1　Aug. 22, 2024

(30) Foreign Application Priority Data

Dec. 27, 2021　(JP) ................................ 2021-211871

(51) Int. Cl.
*G06T 7/00* (2017.01)
*G06T 7/13* (2017.01)
(Continued)

(52) U.S. Cl.
CPC .............. *G06T 7/0002* (2013.01); *G06T 7/13* (2017.01); *G06V 10/44* (2022.01); *G06V 10/764* (2022.01);
(Continued)

(58) Field of Classification Search
CPC ..................... G06T 7/0002; G06T 7/13; G06T 2207/20081; G06T 2207/20084;
(Continued)

(56) References Cited

U.S. PATENT DOCUMENTS 10,453,197 B1 * 10/2019 Cholakkal ............ G06N 3/0464
11,854,250 B2 * 12/2023 Sakai ........................ G06T 7/13
(Continued)

FOREIGN PATENT DOCUMENTS

CN　202013324 U　10/2011
JP　2001-321736 A　11/2001
(Continued)

OTHER PUBLICATIONS

International Preliminary Report on Patentability mailed Jun. 20, 2024 in connection with International Patent Application No. PCT/JP2022/037550, filed Oct. 7, 2022, 10 pgs. (including translation).
(Continued)

*Primary Examiner* — Xuemei G Chen
(74) *Attorney, Agent, or Firm* — Chiesa Shahinian & Giantomasi PC

(57) ABSTRACT

A server according to one aspect includes a learning model storing unit, a receiving unit, an estimating unit, and a transmitting unit. The learning model storing unit stores a learning model learned by a neural network with an image for learning as an input value and the number of used oshiboris as an output value, the image for learning of the used oshiboris stored in a collection box photographed from above. The receiving unit receives an image for estimation photographed from above by a portable terminal. The estimating unit estimates the number of used oshiboris from the image for estimation received by the receiving unit, with the learning model stored in the learning model storing unit, by the neural network. The transmitting unit that transmits an
(Continued)

estimation result estimated by the estimating unit toward the portable terminal.

12 Claims, 11 Drawing Sheets

(51) Int. Cl.

| | |
|---|---|
| *G06V 10/44* | (2022.01) |
| *G06V 10/764* | (2022.01) |
| *G06V 10/774* | (2022.01) |
| *G06V 10/776* | (2022.01) |
| *G06V 10/82* | (2022.01) |
| *G06V 10/94* | (2022.01) |
| *G06V 20/60* | (2022.01) |

(52) U.S. Cl.

CPC .......... *G06V 10/774* (2022.01); *G06V 10/776* (2022.01); *G06V 10/82* (2022.01); *G06V 10/95* (2022.01); *G06V 20/60* (2022.01); *G06T 2207/20081* (2013.01); *G06T 2207/20084* (2013.01); *G06T 2207/30242* (2013.01)

(58) Field of Classification Search

CPC .......... G06T 2207/30242; G06V 10/44; G06V 10/764; G06V 10/774; G06V 10/776; G06V 10/82; G06V 10/95; G06V 20/60; G06Q 10/0832; G06Q 10/087; G06Q 50/10

See application file for complete search history.

(56) References Cited

U.S. PATENT DOCUMENTS

| | | | |
|---|---|---|---|
| 2017/0245667 | A1 | 8/2017 | Gaines |
| 2019/0130214 | A1 | 5/2019 | N et al. |
| 2020/0151511 | A1 | 5/2020 | Tsutsumi et al. |
| 2020/0321104 | A1* | 10/2020 | Lindström ............. G16H 40/67 |
| 2020/0334635 | A1* | 10/2020 | Busey ...................... G06N 5/02 |
| 2021/0065351 | A1 | 3/2021 | Yamaji et al. |
| 2021/0113093 | A1 | 4/2021 | Nozawa et al. |
| 2021/0216827 | A1* | 7/2021 | Hayaishi ................ G06V 10/82 |
| 2021/0309248 | A1 | 10/2021 | Choe et al. |
| 2022/0375212 | A1 | 11/2022 | Sakai et al. |
| 2023/0150141 | A1* | 5/2023 | Chou ....................... B25J 9/163 |
| | | | 700/245 |
| 2023/0294278 | A1* | 9/2023 | Ishige ................... B25J 13/081 |
| 2023/0419643 | A1* | 12/2023 | Li ........................... G06N 3/084 |
| 2024/0237861 | A1* | 7/2024 | Keller ................... A47K 10/46 |

FOREIGN PATENT DOCUMENTS

| | | | |
|---|---|---|---|
| JP | 2002-032844 | A | 1/2002 |
| JP | 2019-153077 | A | 9/2019 |
| JP | 2020-080003 | A | 5/2020 |
| JP | 7004375 | B1 | 1/2022 |
| WO | 2019/045091 | A1 | 3/2019 |
| WO | 2022059404 | A1 | 3/2022 |

OTHER PUBLICATIONS

International Search Report and Written Opinion mailed Dec. 13, 2022, in connection with International Patent Application No. PCT/JP2022/037550, 10 pgs. (including translation).

Sakai, Yasuyuki, and Washizaki, Hironori, "Automatic estimation of the number of used rental hand towels by deep learning". vol. 83, No. 1, Mar. 4, 2021, pp. 1.125-1.126, Proceedings of the National Convention of IPSJ.

"New development in the industry! "Wet Towel AI" app Just take a picture with your smartphone, and AI will automatically measure the number of towels collected", [online] Nov. 25, 2021. https://www.atpress.ne.jp/news/286710.

Notice of Reasons for Refusal mailed Apr. 4, 2023, in connection with Japanese Patent Application No. 2021-211871, 6 pgs. (including translation).

International Search Report and Written Opinion mailed Sep. 28, 2021, in connection with International Patent Application No. PCT/JP2021/029993, filed Aug. 17, 2021, 8 pgs. (including translation).

Second Office Action mailed Jan. 18, 2023 in connection with Chinese Patent Application No. 202180006691.4, 18 pgs. (including translation).

International Preliminary Report on Patentability (IPRP) mailed Mar. 21, 2023 in connection with International Patent Application No. PCT/JP2021/029993, filed Aug. 17, 2021, 8 pgs. (including translation).

First Office Action mailed Oct. 20, 2022 in connection with Chinese Patent Application No. 202180006691.4, 17 pgs. (including translation).

* cited by examiner

Mean Square Error
Between Correct Answer Label And Estimation Result

SERVER AND OSHIBORI MANAGEMENT SYSTEM

This application is a 35 U.S.C. 371 of International Patent Application No. PCT/JP2022/037550, filed Oct. 7, 2022, which claims the benefit of priority to Japanese Patent Application No. 2021-211871, filed Dec. 27, 2021; the disclosures of all of which are incorporated herein by reference in their entireties.

TECHNICAL FIELD

The present invention relates to a server and an oshibori (wet hand towel) management system for estimating the number of used oshiboris (wet hand towels) in a collection box.

BACKGROUND ART

Oshiboris lent out to a restaurant or the like are used in the restaurant and then collected in a state of being casually put in a collection box. A deliverer who delivers and collects the oshiboris needs to check the number of used oshiboris in the collection box in order to grasp the number of oshiboris to be delivered next time and the number of lost oshiboris. However, the operation of counting the oshiboris one by one is inefficient, and there is no time to count the oshiboris. Therefore, the deliverer visually recognizes the amount of the oshiboris in the collection box and estimates the number of oshiboris from an empirical rule.

However, it is difficult for the deliverer inexperienced in collecting oshiboris to estimate the number of oshiboris. In addition, since various deliverers estimate the number of oshiboris, unevenness occurs in the estimated numbers. Therefore, it is desired to construct a system for counting oshiboris. For example, an individual counting system described in Patent Literature 1 is known as a system for counting individuals.

CITATION LIST

Patent Literature

Patent Literature 1: JP 2019-153077 A

SUMMARY OF INVENTION

Technical Problem

The individual counting system described in Patent Literature 1 counts moving individuals such as fish and is not a system that counts objects that do not move like oshiboris. The size of oshiboris is determined and the oshiboris do not move. However, since the oshiboris are unevenly stored in the collection box, the density is not constant and the number of oshiboris in the collection box cannot be calculated based on the volume of the collection box. In addition, since the amounts of moisture stored in the used oshiboris is different from one another, the weights of the used oshiboris are also different from one another. Even if the same oshiboris are used, the weights of the oshiboris before use and the used oshiboris are different from each other. Therefore, the number of oshiboris in the collection box cannot be calculated based on the weight of the collection box storing the oshiboris.

An object of the present invention is to provide a server and an oshibori management system capable of quickly estimating the number of used oshiboris stored in a collection box.

Solution to Problem

A server according to one aspect includes a learning model storing unit, a receiving unit, an estimating unit, and a transmitting unit. The learning model storing unit stores a learning model learned by a neural network with an image for learning as an input value and the number of used oshiboris as an output value, the image for learning of the used oshiboris stored in a collection box photographed from above. The receiving unit receives an image for estimation photographed from above by a portable terminal. The estimating unit estimates the number of used oshiboris from the image for estimation received by the receiving unit, with the learning model stored in the learning model storing unit, by the neural network. The transmitting unit that transmits an estimation result estimated by the estimating unit toward the portable terminal.

The server according to the aspect further includes a corrected number acquiring unit that acquires a corrected number correcting the number of used oshiboris in the estimation result. The learning model is a secondary deep learning model being deep-learned by the neural network with the image for learning, a corrected image for estimation and an uncorrected image for estimation as the input value. The uncorrected image for estimation is estimated with a primary deep learning model. The corrected image for estimation is the image for estimation photographed in the past and corrected the estimation result. The uncorrected image for estimation is the image for estimation photographed in the past and without corrected the estimation result. The number of used oshiboris in the uncorrected image for estimation is estimated with the primary deep learning model deep-learned by the neural network with the image for learning and the corrected image for estimation as the input value.

Further, the learning model storing unit of the server according to the aspect stores the learning model learned with the image for learning with image data of further on an outer side than an outer frame of the collection box deleted. The estimating unit of the server according to the aspect estimates the number of used oshiboris with the image for estimation with the image data of further on the outer side than the outer frame of the collection box deleted.

The server according to the aspect further includes a color correcting unit that corrects a color of the collection box appearing in the image for estimation to a color of the collection box appearing in the image for learning or an approximate color of the color.

The server according to the aspect further includes a density detecting unit that detects density of the used oshiboris in the collection box based on the image for estimation. The estimating unit of the server according to the aspect estimates the number of used oshiboris using the density detected by the density detecting unit. The server according to the aspect further includes a density acquiring unit that acquires whether density of the used oshiboris in the collection box is higher than predetermined density. The estimating unit of the server according to the aspect estimates the number of used oshiboris using a result acquired by the density acquiring unit.

The server according to the aspect further includes an arithmetic operation unit that performs an arithmetic operation concerning the number of used oshiboris. The receiving unit of the server according to the aspect receives a plurality of images for estimation. The estimating unit of the server according to the aspect respectively estimates numbers of used oshiboris in the images for estimation. The arithmetic operation unit of the server according to the aspect calculates an average of a plurality of estimation results estimated by the estimating unit.

The server according to the aspect further includes an abnormal value detecting unit that detects an abnormal value in the estimation results. The arithmetic operation unit of the server according to the aspect calculates the average of the estimation results excluding the abnormal value detected by the abnormal value detecting unit.

Further, the learning model storing unit of the server according to the aspect stores the learning model incorporating a parameter for estimating the number of used oshiboris from an extracted contour of an outer edge of a used oshibori group with respect to an extracted outer frame of the collection box. The extracted outer frame of the collection box and the extracted contour of the outer edge of the used oshibori group is extracted from the image for learning. The used oshibori group is stored in the collection box.

The server according to the aspect further includes a type acquiring unit that acquires a type of oshibori and a correction coefficient storing unit that stores a correction coefficient based on weight of the oshibori set for each type of oshibori. The estimating unit of the server according to the aspect acquires the correction coefficient of the type of oshibori acquired by the type acquiring unit from the correction coefficient storing unit and corrects the number of used oshiboris using the acquired correction coefficient.

A server according to one aspect includes a learning model storing unit, a receiving unit, an estimating unit, and a transmitting unit. The learning model storing unit stores a learning model learned by a neural network with an image for learning as an input value and the number of second used oshiboris stored in a collection box as an output value. The image for learning of first used oshiboris is stored in the collection box photographed from above. The second used oshiboris is different from the first used oshiboris. The receiving unit receives an image for estimation of the first used oshiboris stored in the collection box photographed from above with a portable terminal. The estimating unit estimates the number of first used oshiboris from the image for estimation received by the receiving unit, with the learning model stored in the learning model storing unit, by the neural network. The transmitting unit transmits an estimation result estimated by the estimating unit toward the portable terminal.

An oshibori management system according to one aspect includes a portable terminal, the server according to one aspect, and a core system. The portable terminal includes a first information receiving unit and a first information transmitting unit. The first information receiving unit receives pre-collection store information from the core system. The pre-collection store information includes a store to which oshiboris are delivered, a type of the oshiboris used by the store, a number of the oshiboris delivered to the store, a number of the oshiboris collected from the store, and a number of the oshiboris in stock at the store. The first information transmitting unit transmits post-collection store information added the estimation result to the pre-collection store information received by the first information receiving unit to the core system. The core system includes an information storing unit, a second transmitting unit, a second information receiving unit, and an update unit. The information storing unit stores pre-collection store information. The second transmitting unit transmits the pre-collection store information stored in the information storing unit to the portable terminal. The second information receiving unit receives the post-collection store information transmitted from the portable terminal. The update unit updates the pre-collection store information by causing the information storing unit to store the post-collection store information received from the second information receiving unit.

Advantageous Effects of Invention

According to the present invention, it is possible to provide a server and an oshibori management system that can quickly estimate the number of used oshiboris stored in a collection box.

DESCRIPTION OF EMBODIMENT

Figure 1:
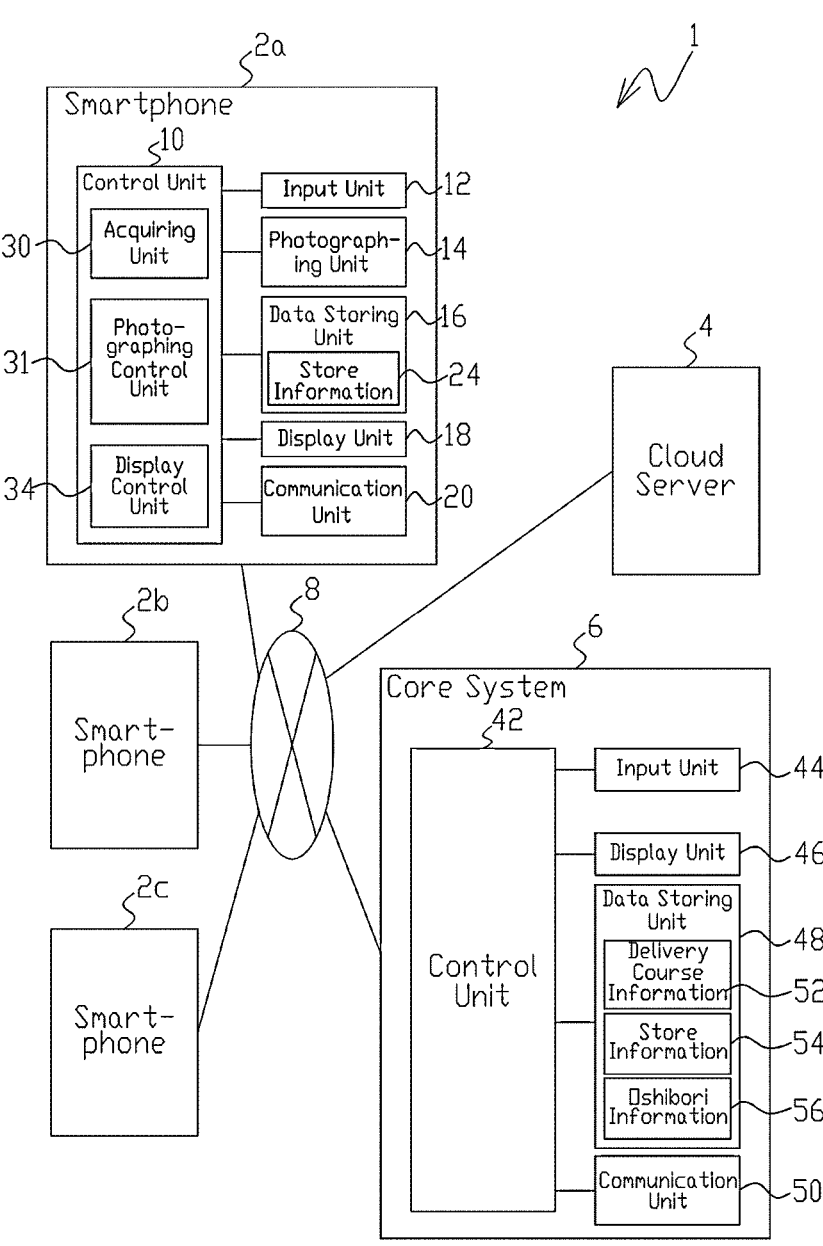
FIG. 1 is a block diagram of an oshibori management system according to a first embodiment.

An oshibori management system according to a first embodiment of the present invention is explained below with reference to the drawings. FIG. 1 is a block diagram for explaining the oshibori management system according to the first embodiment. An oshibori management system 1 according to the first embodiment is a system for managing the number of oshiboris to be lent out to a store such as a restaurant and includes a plurality of smartphones 2a, 2b, and 2c, a Cloud server 4, and a core system 6 as illustrated in FIG. 1.

Figure 2:
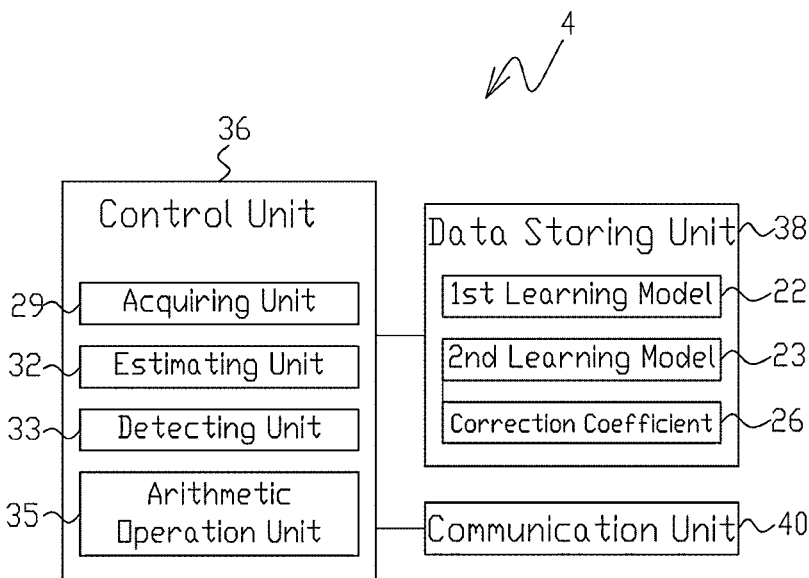
FIG. 2 is a block diagram of a Cloud server system according to the first embodiment.

The smartphones 2a to 2c are portable terminals (portable information terminals) carried by a deliverer who delivers oshiboris to stores and collects used oshiboris from the stores and may be tablets or the like. The Cloud server 4 is a server that collects and stores data uploaded from the smartphones 2a to 2c. The Cloud server 4 is a server including a system for estimating the number of used oshiboris stored in a collection box. FIG. 2 is a block diagram illustrating a system configuration of the Cloud server 4. The Cloud server 4 may be another server such as a physical server. The core system 6 is a personal computer or the like disposed in an office building. The smartphones 2a to 2c, the Cloud server 4, and the core system 6 are connected to one another by a network 8. Although FIG. 1 illustrates a case where three smartphones 2a to 2c are connected to the network 8. Actually, a large number of smartphones like the smartphones 2a to 2c are connected to the network 8. In the present embodiment, the case where the Cloud server 4 and the core system 6 are connected by the network 8 is taken as an example. However, a system in which a server and a core system are integrally formed, that is, a core system having a server function (including a function as a system for estimating the number of used oshiboris) may be used.

The smartphone 2a includes a control unit (a controller) 10 that comprehensively controls each unit of the smartphone 2a as illustrated in FIG. 1. An input unit 12, a photographing unit 14, a data storing unit 16, a display unit 18, and a communication unit 20 are connected to the control unit 10.

Figure 3:
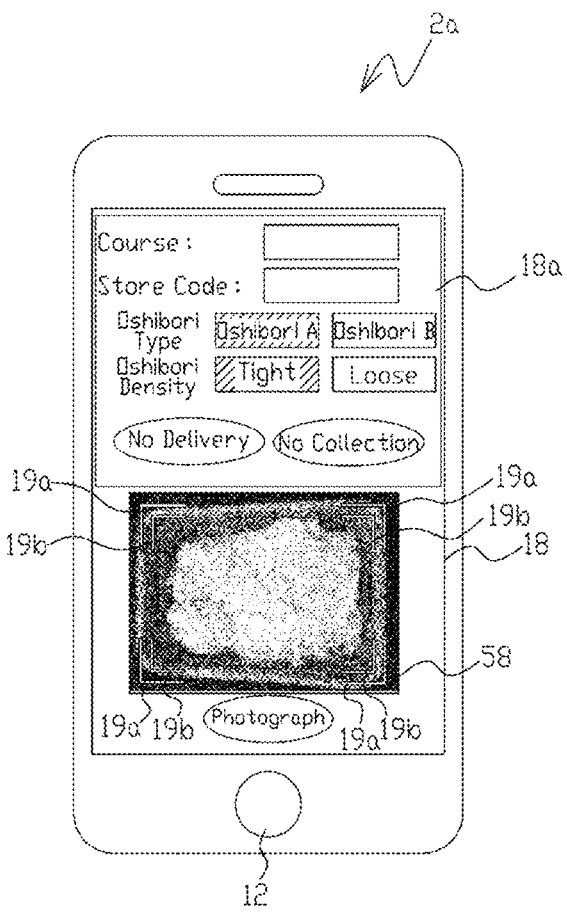
FIG. 3 is a diagram illustrating a display example on a display unit of the smartphone according to the first embodiment.

The input unit 12 is a touch panel, a button, or the like, and inputs information concerning the store (store code) where used oshiboris are used, a type of oshiboris (oshiboris A or oshiboris B), and the like when the used oshiboris are collected (see FIG. 3). In addition, the input unit 12 inputs whether or not the density of used oshiboris in the collection box is higher than predetermined density ("tight" or "loose") (see FIG. 3). The photographing unit 14 is a camera or the like and photographs, according to an instruction of the control unit 10 (a photographing control unit 31 explained below), the used oshiboris stored in the collection box from above when the used oshiboris are collected. In the present embodiment, the photographing unit 14 photographs three images for estimation (images obtained by photographing the used oshiboris stored in the collection box from above).

The data storing unit 16 stores an image photographed by the photographing unit 14, store information 24 concerning the store where a deliverer collects used oshiboris, and the like. The store information 24 includes store information before collection such as a delivery course (delivery area) code, a store code, a type of oshiboris (oshiboris A or B), an actual average number of oshiboris collected the most recent any number of times, the number of oshiboris delivered last time, the number of oshiboris collected last time, and the number of oshiboris in stock in the store.

Figure 4:
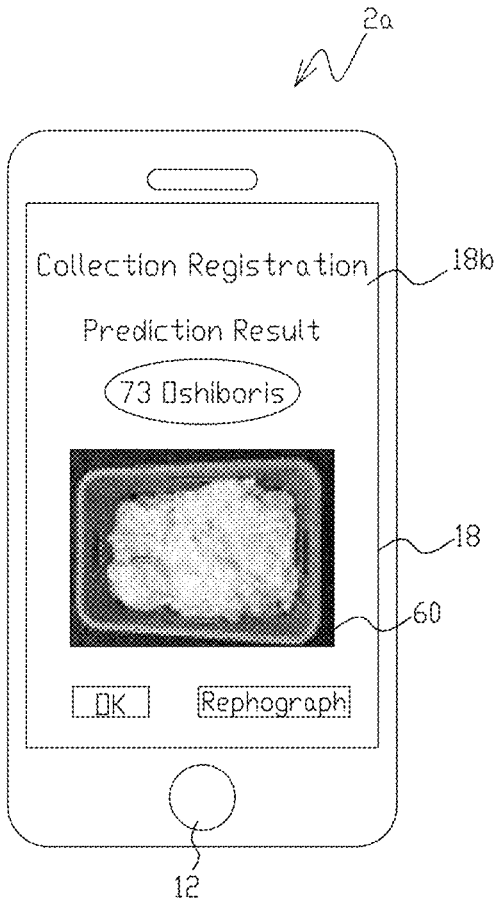
FIG. 4 is a diagram illustrating a display example on the display unit of the smartphone according to the first embodiment.
Figure 5:
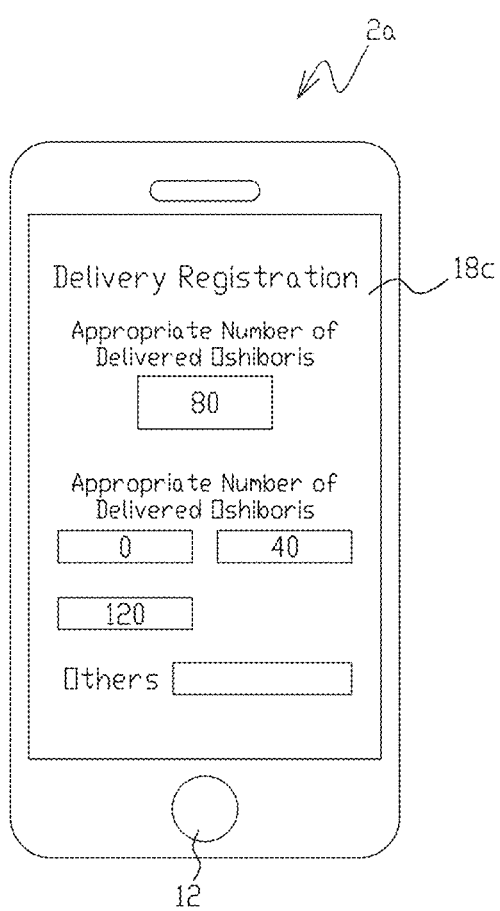
FIG. 5 is a diagram illustrating a display example on the display unit of the smartphone according to the first embodiment.

The display unit 18 is a liquid crystal display panel or the like. The display unit 18 displays a screen for inputting the store and oshibori information according to an instruction from the control unit 10 (a display control unit 34 explained below). The display unit 18 displays a screen for displaying an estimation result of the number of oshiboris estimated by the Cloud server 4 (explained below), and the like. FIGS. 3 to 5 are diagrams illustrating display examples on the display unit 18 of the smartphone 2a according to the present embodiment. FIGS. 3 to 5 will be explained below.

The communication unit 20 communicates with the Cloud server 4 and the core system 6 via the network 8. According to an instruction of the control unit 10, the communication unit 20 receives, from the core system 6 via the network 8, store information included in the delivery course input via the input unit 12, that is, store information before collection such as the store that delivers oshiboris, a type of oshiboris used by the store, the latest any number of times of oshibori collection actual average number, the number of oshiboris delivered last time, the number of oshiboris collected last time, the number of oshiboris in stock in the store, and an oshibori delivery stop flag to the store. The communication unit 20 transmits, to the Cloud server 4 via the network 8, three images for estimation photographed by the photographing unit 14, the type of oshiboris input from the input unit 12, and the density of used oshiboris input from the input unit 12. According to an instruction of the control unit 10, the communication unit 20 receives, from the Cloud server 4 via the network 8, an estimated number of used oshiboris result estimated by the Cloud server 4. In addition, the communication unit 20 transmits, according to an instruction from the control unit 10, to the Cloud server 4 via the network 8, post-collection store information obtained by adding a collection date, an estimated number of used oshiboris, photographing position information, and the like to the pre-collection store information received from the core system 6.

Furthermore, the control unit 10 includes an acquiring unit 30, a photographing control unit (a photographing controller) 31, and a display control unit (a display controller) 34. The acquiring unit 30 acquires various kinds of information such as the store code input via the input unit 12 and an image photographed by the photographing unit 14. When the outer frame of the collection box fits between a guide frame 19a on the outer side and a guide frame 19b on the inner side (see FIG. 3) displayed on the display unit 18, the photographing control unit 31 causes the photographing unit 14 to photograph an image for estimation.

The display control unit 34 causes the display unit 18 to display a screen 18a for inputting the store and oshibori information illustrated in FIG. 3, a collection registration screen 18b indicating an estimated number of oshiboris result estimated by the Cloud server 4 illustrated in FIG. 4, a delivery registration screen 18c indicating a proper number of oshiboris to be delivered illustrated in FIG. 5, and the like. Furthermore, when the photographing unit 14 photographs an image for estimation, the display control unit 34 causes the display unit 18 to display a live view image and causes the display unit 18 to display the guide frames 19a and 19b for guiding the position of the outer frame of the collection box with respect to a photographing range (see FIG. 3). Note that, since the configuration of the smartphones 2b and 2c is the same as the configuration of the smartphone 2a, explanation of the configuration is omitted.

Next, a configuration of the Cloud server 4 is explained. The Cloud server 4 includes a system for estimating, when a deliverer collects used oshiboris, using artificial intelligence (AI), the number of used oshiboris stored in a collection box. As illustrated in FIG. 2, the Cloud server 4 includes a control unit (a controller) 36 that comprehensively controls units of the Cloud server 4. A data storing unit 38 and a communication unit 40 are connected to the control unit 36.

The data storing unit 38 stores post-collection store information transmitted from the smartphones 2a to 2c after collection of used oshiboris is finished. The data storing unit 38 also stores information necessary for arithmetic processing by the control unit 36, a first learning model 22 and a second learning model 23 used for estimation by an estimating unit 32 explained below, and a correction coefficient 26 set for each type of oshiboris, and the like.

The first learning model 22 and the second learning model 23 are models learned in advance in order to estimate the number of used oshiboris stored in the collection box using AI and are incorporated in advance in the number of oshiboris estimation system. The first learning model 22 and the second learning model 23 are models learned by a neural network having, as an input value, an image for learning obtained by photographing used oshiboris stored in the collection box from above and the number of used oshiboris as an output value. The first learning model 22 and the second learning model 23 also incorporate parameters for extracting, from the image for learning, an outer frame of the collection box and a contour of the outer edge of the used oshibori group stored in the collection box (all the used oshiboris stored in the collection box) and for estimating the number of used oshiboris from the extracted contour of the outer edge of the used oshibori group with respect to the extracted outer frame of the collection box.

The neural network is divided into an input layer, an intermediate layer, and an output layer. In the input layer, data obtained by dividing the image for learning into pixels is input, and a contour of the image is extracted from the input data. Next, in the intermediate layer, the contour of the image extracted in the input layer is subjected to an image analysis. In the output layer, an estimated number of used oshiboris result is output based on a result of the image analysis in the intermediate layer. The neural network mathematically calculates a number of oshiboris value (for example, 5 to 320) from the illuminance value of 0 to 1×the number of pixels for each pixel of the image. As the intermediate layer, a convolution layer, a pooling layer, a dropout layer, a fully connected layer, and a flattening layer are used in combination. Hundreds to tens of millions of parameters are stored in each layer. By performing tuning using a large number of images for learning, weighting of the parameters of the layers is changed such that an accurate result (accurate number of oshiboris) can be derived as much as possible from the input layer to the output layer via the intermediate layer.

The first learning model 22 is a learning model in the case where the density of used oshiboris stored in the collection box is higher than predetermined density (case of "tight"). The second learning model 23 is a learning model in the case where the density of used oshiboris stored in the collection box is equal to or lower than the predetermined density (case of "loose"). That is, in the case of "tight" and the case of "loose", the number of oshiboris is naturally different even if the oshiboris are the same and the volume of oshiboris in the collection box is the same. However, in the present embodiment, the accuracy of estimating the number of oshiboris is improved by dividing the learning model into the first learning model 22 and the second learning model 23 according to the density.

In the oshibori management system according to the present embodiment, it is assumed that the oshiboris A and the oshiboris B having the same size and different thicknesses, that is, the oshiboris A and the oshiboris B having different weights and volumes depending on differences in thickness are managed. The first learning model 22 and the second learning model 23 are models learned about the oshiboris A.

The correction coefficient 26 is a coefficient determined for each type of oshiboris (In the present embodiment, oshiboris A and B). Since the first learning model 22 and the second learning model 23 are models learned about the oshiboris A, an indication that a correction coefficient of the oshiboris A (reference oshiboris) is 1 or the oshiboris A are the reference oshiboris is stored in the data storing unit 38. A correction coefficient of the oshiboris B is set from the weight and the number of oshiboris B with respect to the standard oshiboris and is stored in the data storing unit 38 (the correction coefficient 26).

The communication unit 40 communicates with each of the smartphones 2a to 2c and the core system 6 via the network 8. Specifically, the communication unit 40 receives, from each of the smartphones 2a to 2c via the network 8, three images for estimation photographed by the photographing unit 14 of each of the smartphones 2a to 2c, the type of oshiboris input from the input unit 12 of each of the smartphones 2a to 2c, and the density of used oshiboris input from the input unit 12. According to an instruction of the control unit 36, the communication unit 40 transmits, from each of the smartphones 2a to 2c via the network 8, the number of oshiboris result estimated by the estimating unit 32. According to an instruction of the control unit 36, the communication unit 40 receives post-collection store information obtained by adding a collection date, an estimated number of used oshiboris, photographing position information, and the like to store information before collection from the smartphones 2a to 2c via the network 8. In addition, the communication unit 40 transmits the post-collection store information received from the smartphones 2a to 2c to the core system 6 via the network 8 according to an instruction of the control unit 36.

The control unit 36 includes an acquiring unit 29, an estimating unit 32, a detecting unit 33, and an arithmetic operation unit 35. The acquiring unit 29 acquires images received via the communication unit 40 after photographed by the photographing unit 14 of each of the smartphones 2a to 2c, and the density of used oshiboris received via the communication unit 40 after input from the input unit 12 of each of the smartphones 2a to 2c. The acquiring unit 29 also acquires information necessary for arithmetic processing by the control unit 36 from the data storing unit 3.

The estimating unit 32 estimates, using the first learning model 22 or the second learning model 23 stored in the data storing unit 38, the number of used oshiboris from an image for estimation photographed the used oshiboris stored in the collection box from above by the photographing unit 14 of each of the smartphones 2a to 2c and acquired by the acquiring unit 29. At this time, the estimating unit 32 estimates the number of used oshiboris using the first learning model 22 when the density of used oshiboris acquired by the acquiring unit 29 is higher than the predetermined density (when "tight" is selected) and using the second learning model 23 when the density of used oshiboris acquired by the acquiring unit 29 is equal to or lower than the predetermined density (when "loose" is selected). That is, pixel data of an image for estimation is input to the input layer of the neural network, a contour of an image is extracted from the pixel data, an image analysis is performed in the intermediate layer about the contour of the image extracted in the input layer, and an estimated number of used oshiboris result of used oshiboris estimated from a result of the image analysis in the intermediate layer is output in the output layer. At this time, contours of the outer frame of the collection box and a contour of the outer edge of a used oshibori group stored in the collection box are also extracted from the image for estimation. An estimated number of used oshiboris result is output using a parameter for estimating the number of used oshiboris from the extracted contour of the outer edge of the used oshibori group with respect to the outer frame of the collection box.

The estimated number of used oshiboris result estimated using the first learning model 22 or the second learning model 23 is an estimated number of oshiboris A result. Therefore, in the case of the oshiboris B, the estimating unit 32 acquires the correction coefficient of the oshiboris B from the correction coefficient 26 of the data storing unit 38 via the acquiring unit 29 and corrects the estimated number of used oshiboris using the correction coefficient of the oshiboris B such that the estimated number of oshiboris result of the oshiboris B is obtained from the estimated number of oshiboris A.

The detecting unit 33 detects abnormal values of a plurality of (three) estimation results obtained by the estimating unit 32. In the case where a difference between the first estimation result and another estimation result exceeds a threshold, the detecting unit 33 discriminates the first estimation result as an abnormal value and performs similar discrimination about second and third estimation results. The arithmetic operation unit 35 performs an arithmetic operation concerning the number of used oshiboris. The arithmetic operation unit 35 calculates an average of a plurality of (three) estimation results estimated by the estimating unit 32. When an abnormal value is detected by the detecting unit 33, the arithmetic operation unit 35 calculates an average of a plurality of (two) estimation results excluding the abnormal value detected by the detecting unit 33.

Next, a configuration of the core system 6 is explained. The core system 6 includes a control unit (a controller) 42 that comprehensively manages overall information concerning rental oshiboris and comprehensively controls units of the core system 6 as illustrated in FIG. 1. An input unit 44, a display unit 46, a data storing unit 48, and a communication unit 50 are connected to the control unit 42.

The input unit 44 is a keyboard, a mouse, or the like. The control unit 42 obtains an input result input by a user of the core system 6 via the input unit 44. The display unit 46 is a liquid crystal panel or the like and displays delivery course information, store information, oshibori information, and the like. The data storing unit 48 stores delivery course information 52, which is information concerning a delivery course (a delivery area) including a delivery course code, store information 54, which is information concerning the store that delivers rental oshiboris, and oshibori information 56, which is information concerning a type of oshiboris and the like and a login authentication key of another user (a deliverer), an expiration date of the authentication key, a user name, a password, a belonging company name, a unit of the number of delivered oshiboris (package unit) of the belonging company, and the like.

The communication unit 50 communicates with the smartphones 2a to 2c and the Cloud server 4 via the network 8. The communication unit 50 transmits store information including a delivery course code to the smartphones 2a to 2c via the network 8 as pre-collection store information according to an instruction of the control unit 42. According to an instruction from the control unit 42, the communication unit 50 receives post-collection store information obtained by adding a collection date, an estimated number of used oshiboris, photographing position information, and the like to the store information before collection from the Cloud server 4 via the network 8. The control unit 42 updates store information 54 by causing the data storing unit 48 to store the post-collection store information received from the Cloud server 4.

Figure 6:
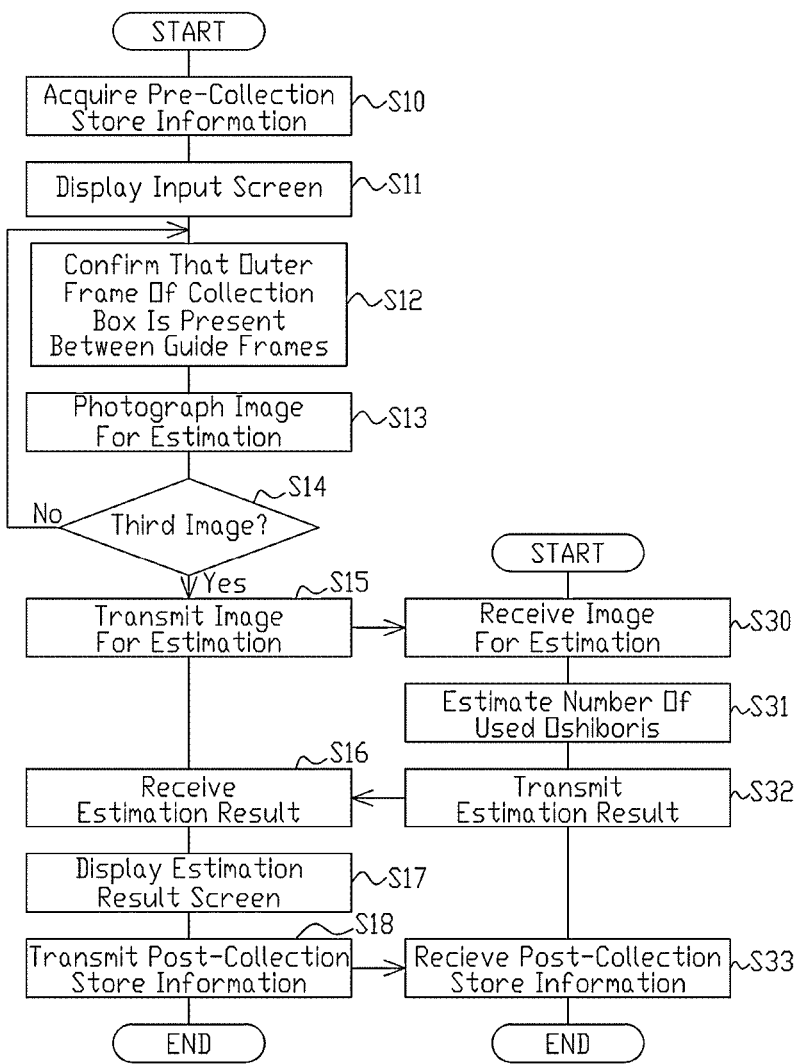
FIG. 6 is a flowchart explaining processing executed by the oshibori management system according to the first embodiment in order to estimate the number of used oshiboris stored in a collection box.

Next, a number of oshiboris estimating method for estimating the number of used oshiboris stored in the collection box using the oshibori management system 1 according to the first embodiment is explained with reference to the drawings. FIG. 6 is a flowchart for explaining processing executed by the oshibori management system 1 in order to estimate the number of used oshiboris stored in the collection box.

First, the deliverer confirms a delivery course for going around to collect oshiboris on the day and inputs a delivery course code (inputs a "course" illustrated in FIG. 3) via the input unit 12. Thereafter, the control unit 10 of the smartphone 2a carried by the deliverer acquires store information (pre-collection store information) included in the delivery course from the core system 6 (step S10). The control unit 10 acquires the delivery course code input from the deliverer via the input unit 12, transmits the acquired delivery course code to the core system 6 via the communication unit 20 and the network 8, and requests the core system 6 to provide the store information included in the delivery course. The control unit 42 of the core system 6 receives, via the network 8 and the communication unit 50, the delivery course code and the provision request for the store information included in the delivery course transmitted from the smartphone 2a. Then, the control unit 42 reads store information of the store code linked with the delivery course code from the data storing unit 48 and transmits the store information to the smartphone 2a via the communication unit 50 and the network 8. The control unit 10 of the smartphone 2a receives the store information included in the delivery course via the network 8 and the communication unit 20 and causes the data storing unit 16 to store the store information as the store information 24.

Next, when the deliverer arrives at a first store and collects used oshiboris and the smartphone 2a receives an instruction to start estimating the number of oshiboris from the deliverer by operating the input unit 12, the display control unit 34 of the control unit 10 causes the display unit 18 to display the screen 18a illustrated in FIG. 3 (step S11). At this time, the display control unit 34 causes the display unit 18 to also display the guide frames 19a and 19b for guiding the outer frame of the collection box with respect to a photographing range of a live view image 58 to be a predetermined position. Then, the control unit 10 checks the store code, the type of oshiboris, and the oshibori density input via the input unit 12. Furthermore, the control unit 10 confirms whether the outer frame of the collection box is fit between the guide frame 19a and the guide frame 19b displayed in the live view image 58. At this time, all store codes may be read in advance from the store information 24 to make it possible to select the store code in a pull-down format. When the store code is input, a type of oshiboris (a type of oshiboris contracted with the store) linked with the store code may be read from the store information 24 to automatically select the type of oshiboris. FIG. 3 illustrates a case where "oshiboris A" and "tight" are selected.

The deliverer taps a "no delivery" button illustrated in FIG. 3 for the store that is included in the delivery course but does not request delivery of oshiboris on the day (neither collection nor delivery of oshiboris). When confirming that the "no delivery" button is tapped via the input unit 12, the control unit 10 causes the data storing unit 16 to store post-collection store information obtained by adding a delivered flag to the pre-collection store information relating to the store, skips processing in steps S12 to S17, and executes processing in step S18 explained below.

The deliverer taps a "no collection" button illustrated in FIG. 3 for the store that is included in the delivery course but does not request collection of the oshiboris on the day (requests only delivery of oshiboris). When confirming that the "no collection" button is tapped via the input unit 12, the control unit 10 sets the number of used oshiboris to be collected relating to the store to 0 and skips the processing in steps S12 to S17. Then, the display control unit 34 of the control unit 10 causes the display unit 18 to display the delivery registration screen 18*c* illustrated in FIG. 5 without causing the display unit 18 to display the collection registration screen 18*b* illustrated in FIG. 4. The control unit 10 executes the processing in step S18 explained below.

After confirming that the outer frame of the collection box is fit between the guide frame 19*a* and the guide frame 19*b* displayed in the live view image 58 (step S12), the photographing control unit 31 of the control unit 10 causes the photographing unit 14 to photograph an image for estimation (step S13). The photographing unit 14 photographs an image for estimation. The control unit 10 acquires the image for estimation photographed by the photographing unit 14 and causes the data storing unit 16 to store the image for estimation. After confirming that the outer frame of the collection box is fit between the guide frame 19*a* and the guide frame 19*b* displayed in the live view image 58, the photographing control unit 31 may permit a photographing instruction for an image for estimation by the deliverer and, when receiving the photographing instruction from the deliverer via the input unit 12, the photographing control unit 31 may cause the photographing unit 14 to photograph the image for estimation.

Next, the control unit 10 determines whether the image for estimation photographed in step S13 is a third image for estimation (step S14). When the image for estimation is not the third image (a first image or a second image) (step S14: No), the control unit 10 repeats the operations of steps S12 and S13. On the other hand, when the image for estimation is the third image (step S14: Yes), the control unit 10 transmits the type of the oshiboris and the density of the oshiboris input by the input unit 12, and the three images for estimation photographed in step S13 to the Cloud server 4 via the communication unit 20 (step S15).

After the control unit 36 of the Cloud server 4 receives the type of the oshiboris, the density of the oshiboris, and the three images for estimation from the smartphone 2*a* via the communication unit 40 (step S30), the control unit 36 causes the acquiring unit 29 to acquire these and causes the estimating unit 32 to estimate the number of used oshiboris (step S31).

First, the estimating unit 32 confirms whether the density of the oshiboris acquired by the acquiring unit 29 is "tight" or "loose". In the case of "tight", the estimating unit 32 reads the first learning model 22, which is a learning model in the case where the oshibori density is higher than a predetermined density, from the data storing unit 38. On the other hand, in the case of "loose", the estimating unit 32 reads the second learning model 23, which is a learning model in the case where the oshibori density is equal to or lower than the predetermined density, from the data storing unit 38. The estimating unit 32 confirms whether the type of the oshiboris acquired by the acquiring unit 29 is "oshiboris A" or "oshiboris B" and reads the correction coefficient of the oshiboris B from the correction coefficient 26 of the data storing unit 38 in the case of "oshiboris B".

Then, the estimating unit 32 estimates the number of used oshiboris using the first learning model 22 when the oshibori density is "tight" and the type of oshiboris is "oshiboris A". When the oshibori density is "tight" and the oshibori type is "oshiboris B", the estimating unit 32 estimates the number of used oshiboris using the first learning model 22 and then corrects the number of used oshiboris by multiplying the estimation result by the correction coefficient of the oshiboris B. When the oshibori density is "loose" and the type of oshibori is "oshiboris A", the estimating unit 32 estimates the number of used oshiboris using the second learning model 23. In the case where the oshibori density is "loose" and the oshibori type is "oshiboris B", the estimating unit 32 estimates the number of used oshiboris using the second learning model 23 and then corrects the number of used oshiboris by multiplying the estimation result by the correction coefficient of the oshiboris B.

The estimating unit 32 extracts a contour of an image, a contour of the outer edge of a used oshibori group with respect to the outer frame of the collection box, and the like with the neural network using the image for estimation as an input value. The estimating unit 32 outputs an estimated number of used oshiboris result as an output value using hundreds to tens of millions of parameters including a parameter for estimating the number of used oshiboris from the contour of the outer edge of the used oshibori group with respect to the outer frame of the collection box.

The estimating unit 32 performs the estimation explained above on each of the three images for estimation acquired by the acquiring unit 29 and transmits three estimation results to the detecting unit 33. The detecting unit 33 detects whether there is an abnormal value in the three estimation results and transmits information concerning the abnormal value such as the presence or absence of the abnormal value to the arithmetic operation unit 35. The arithmetic operation unit 35 calculates an average of the three estimation results when no abnormal value is detected by the detecting unit 33. When an abnormal value is detected by the detecting unit 33, The arithmetic operation unit 35 calculates an average of two estimation results excluding the abnormal value detected by the detecting unit 33.

When finishing the estimation of the number of used oshiboris, the control unit 36 transmits estimation result of the number of used oshiboris estimated in step S31 to the smartphone 2*a* via the communication unit 40 (step S32).

When the control unit 10 of the smartphone 2*a* receives the estimation result of the number of used oshiboris from the Cloud server 4 via the communication unit 20 (step S16), the control unit 10 causes the display unit 18 to display the collection registration screen 18*b* illustrated in FIG. 4 via the display control unit 34 (step S17). The estimation result illustrated in FIG. 4 is 73 oshiboris and an image 60 illustrated in FIG. 4 is an image photographed by the photographing unit 14 and used for the estimation of the number of oshiboris by the estimating unit 32 of the Cloud server 4 (the image 60 is included to the estimation result transmitted by the Cloud server 4). When confirming an input of an OK button from the deliverer via the input unit 12, the display control unit 34 of the control unit 10 causes the display unit 18 to display the delivery registration screen 18*c* illustrated in FIG. 5. The proper number of oshiboris to be delivered illustrated in FIG. 5 is 80, which is a result of selecting the number of oshiboris closest to an estimated number of oshiboris of 73 from choices of 0, 40, 80, and 120. The proper number of oshiboris to be delivered can be corrected by the deliverer via the input unit 12. For example, it is also possible to manually select 0 when the next delivery is not required such as when the store is on a holiday and select 120 (40) when the store desires delivery more (less) than usual for a reason such as a season. It is also possible to input the number of oshiboris other than 0, 40, 80, and 120 in the other fields. The control unit 10 transmits the post-collection store information to which an estimation result, the number of delivered oshiboris, and the like are added to the Cloud server 4 via the communication unit 20 (step S18).

When the control unit 36 of the Cloud server 4 receives the post-collection store information added the estimation result, the number of oshiboris to be delivered and the like from the smartphone 2a via the communication unit 40, the control unit 36 causes it to store the data storing unit 38 (step S33).

The processing illustrated in the flowchart of FIG. 6 is performed on all stores included in the delivery course. Instead of being performed for each of the stores, in the processing of steps S18 and S33, the control unit 10 may store the post-collection store information in the data storing unit 16 of the smartphone 2a and collectively transmit the post-collection store information of several stores to the Cloud server 4. The core system 6 receives the post-collection store information from the Cloud server 4 according to necessity and updates the store information 54 in the data storing unit 48.

With the oshibori management system 1 according to the first embodiment, it is possible to quickly estimate the number of collected used oshiboris without counting the oshiboris one by one. By managing the number of used oshiboris for each store, it is possible to appropriately manage a contracted number of oshiboris, the number of additional oshiboris involved in seasonal variations, the number of collected oshiboris, the number of lost oshiboris, the number of oshiboris in stock in the store, and the like. In addition, using the system for the estimation of the number of oshiboris included to the Cloud server 4 according to the first embodiment, even a deliverer inexperienced in collecting used oshiboris can easily estimate the number of used oshiboris. Even when various deliverers collect oshiboris, it is possible to evenly estimate the number of used oshiboris.

In the embodiment explained above, the case where the photographing unit 14 of the smartphone 2a photographs the three (a plurality of) images for estimation is explained as an example. However, the photographing unit 14 may photograph one image for estimation. In this case, it is unnecessary to include the detecting unit 33 and the arithmetic operation unit 35 in the Cloud server 4. An estimation result by the estimating unit 32 is transmitted to the smartphones 2a to 2c.

In the embodiment explained above, when the difference between one estimation result and the other two estimation results exceeds the threshold, the detecting unit 33 of the Cloud server 4 detects that the one estimation result is an abnormal value. That is, the abnormal value is detected from the comparison with the other two estimation results. However, the abnormal value may be detected from the comparison with estimation results of other days (or other months or other same days of the week) in the same store. When the estimation result on the day is 150 even though the estimated numbers of oshiboris in other days are 40 to 60 in the same store, the detecting unit 33 detects that the estimation result on the day is an abnormal value. The control unit 36 of the Cloud server 4 instructs the smartphones 2a to 2c via the communication unit 40 to perform re-photographing.

In the embodiment explained above, the deliverer inputs, via the input unit 12 of the smartphones 2a to 2c, whether the density of the oshiboris stored in the collection box is higher than the predetermined density. However, the estimating unit 32 of the Cloud server 4 detects the density of the oshiboris based on the image for estimation. A portion of the oshiboris and a portion that is not the oshiboris (a gap between the oshiboris and the oshiboris) are extracted from an image analysis of the image for estimation and the density of the oshiboris is detected based on an extraction result. In addition, instead of the first learning model 22 and the second learning model 23, one machine learning model may be included. Using the machine learning model, the estimating unit 32 of the Cloud server 4 may estimate the density from a surface appearance of the image for estimation (a state of the top surface of the used oshiboris shown in the estimation image). The estimating unit 32 of the Cloud server 4 may estimate the number of used oshiboris taking into account the density estimation result.

In the embodiment explained above, the number of oshiboris is estimated using the first learning model 22 when the density of oshiboris stored in the collection box is higher than the predetermined density and is estimated using the second learning model 23 when the density is equal to or lower than the predetermined density. However, a learning model (a density discrimination learning model) for discriminating whether the density is higher than the predetermined density may be implemented. In this case, whether the density is higher than the predetermined density is discriminated using the density discrimination learning model and the first learning model 22 or the second learning model 23 is selected from a discrimination result.

In addition, when the first learning model 22 or the second learning model 23 is created using the neural network and when the number of used oshiboris is estimated using the first learning model 22 or the second learning model 23 in the embodiment explained above, the pixel data of the image for learning or the image for estimation input to the input layer may be limited to pixel data of only an image further on the inner side than the outer frame of the collection box. That is, an image for learning and an image for estimation obtained by deleting pixel data of an image further on the outer side than the outer frame of the collection box (an image for learning and an image for estimation in which pixel data of an image discriminated as being further on the outer side than the outer frame of the collection box is set to 0) may be used. It is possible to prevent a decrease in accuracy due to reflection of an object outside the box, which is originally unrelated to number of oshiboris information. It is possible to improve efficiency related to estimation of the number of oshiboris.

Next, an oshibori management system according to a second embodiment of the present invention is explained with reference to the drawings. In the oshibori management system according to the second embodiment, the same components as the components of the oshibori management system 1 illustrated in FIGS. 1 and 2 are denoted by the same reference numerals and signs and illustration and explanation of the components are omitted.

Figure 7:
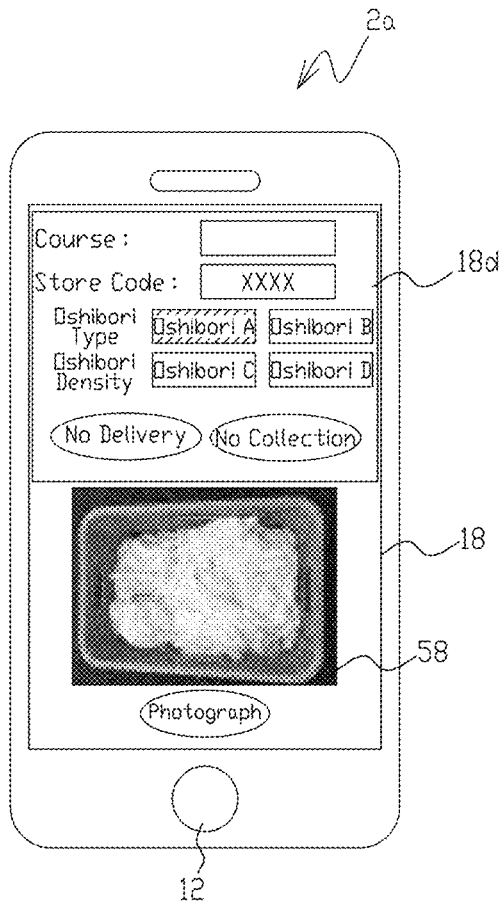
FIG. 7 is a diagram illustrating a display example on a display unit of a smartphone according to a second embodiment.
Figure 8:
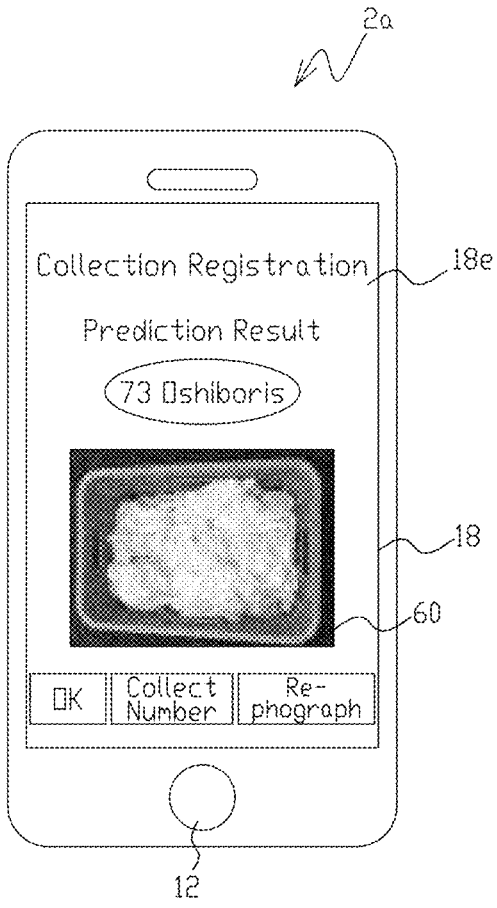
FIG. 8 is a diagram illustrating a display example on the display unit of the smartphone according to the second embodiment.

The display control unit 34 of the smartphone 2a according to the second embodiment causes the display unit 18 to display a screen 18d for inputting the store and oshibori information illustrated in FIG. 7 instead of the screen 18a illustrated in FIG. 3. The display control unit 34 causes the display unit 18 to display a collection registration screen 18e showing estimation results by the estimating unit 32 illustrated in FIG. 8 instead of the collection registration screen 18b illustrated in FIG. 4. In the oshibori management system according to the second embodiment, the smartphones 2a to 2c can optionally correct the number of oshiboris estimated by the estimating unit 32 of the Cloud server 4. When the screen 18e illustrated in FIG. 8 is displayed on the display unit 18 and the deliverer presses (touches) a number of oshiboris correction button via the input unit 12, a screen for inputting the number of oshiboris is displayed on the display unit 18. When the deliverer inputs the number of oshiboris via the input unit 12, the number of oshiboris input by the deliverer is added to the post-collection store information as a corrected number result of oshiboris (a correct answer label) and transmitted to the Cloud server 4 via the communication unit 20. The communication unit 40 of the Cloud server 4 receives the post-collection store information added the corrected number result of the used oshiboris which is corrected the estimation result estimated by the estimating unit 32. The acquiring unit 29 acquires the post-collection store information added the corrected number result. The corrected number result corrected the estimation result is added to corrected image data for estimation 64A explained below (see FIG. 9) and used when a primary deep learning model 66 (see FIG. 9) is created.

The Cloud server 4 according to the second embodiment includes a standard learning model 61 (see FIG. 9), a first-type learning model, and a second-type learning model instead of the first learning model 22 and the second learning model 23 illustrated in FIG. 2.

The standard learning model 61 is a learning model for estimating the number of oshiboris A of a standard color (for example, white) and a standard size stored in a collection box of a standard color (for example, orange). In the case of the oshiboris B, the estimated number of used oshiboris is corrected using the correction coefficient of the oshiboris B such that the estimated number of oshiboris of the oshiboris B is obtained from the estimated number of oshiboris of the oshiboris A using the standard learning model 61. The size of the oshibori B is different from the size of the oshibori A. However, the difference between the sizes of the oshiboris A and B is smaller than the difference between the sizes of the oshiboris A and C or the oshiboris A and D. Therefore, the estimated number of oshiboris of the oshiboris B can be estimated using the standard learning model 61 and the correction coefficient for the oshiboris A. However, since the sizes of the oshiboris C and D are greatly different from the size of the oshiboris A, it is difficult to estimate the number of oshiboris C and D by the standard learning model 61 and the correction coefficient.

The first-type learning model is a learning model for estimating the number of oshiboris C of the standard color stored in the collection box of the standard color. The oshiboris C have a size larger (or smaller) than the oshiboris A and B and are demanded less than the oshiboris A. The second-type learning model is a learning model for estimating the number of oshiboris D of the standard color stored in the collection box of the standard color. The oshiboris D have a size different from the size of the oshiboris C and larger (or smaller) than the oshiboris A and B and are and are demanded less than the oshiboris A and C.

Figure 9:
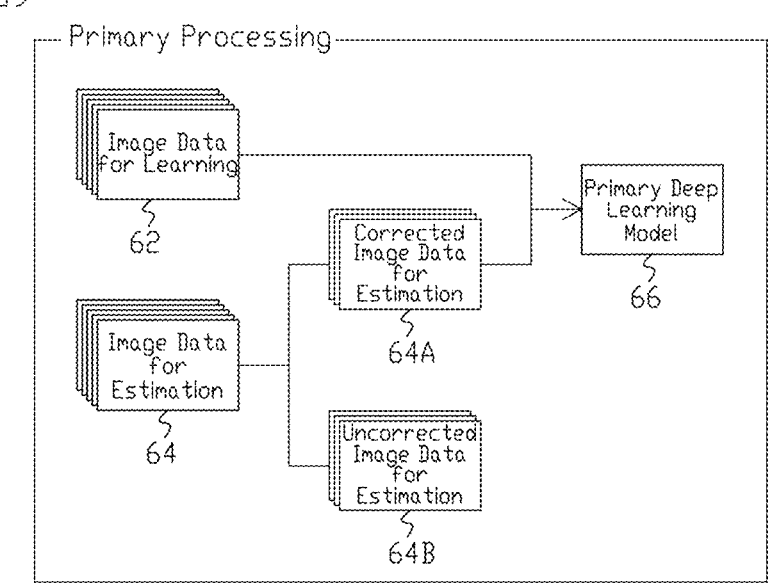
FIG. 9 is a diagram explaining a standard learning model according to the second embodiment.
Figure 9:
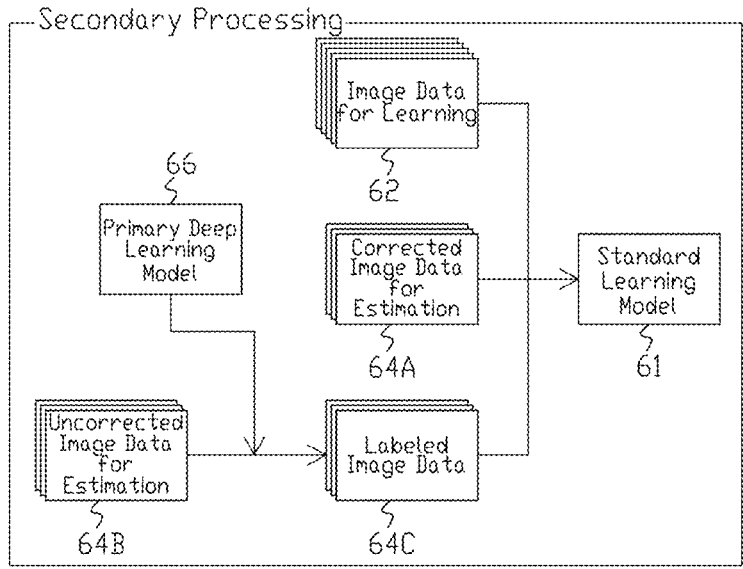

The standard learning model 61, the first-type learning model, and the second-type learning model are models learned in advance using AI like the first learning model 22 and the like according to the first embodiment. As illustrated in FIG. 9, the standard learning model 61 is a learning model created through primary processing and secondary processing. In the primary processing, the primary deep learning model 66 is created by deep learning by adding corrected image data for estimation 64A, which is image data for estimation 64 photographed so far and corrected in the number of oshiboris by the input unit 12, to an image data for learning 62.

In the secondary processing, a secondary deep learning model, that is, the standard learning model 61 is created by deep learning using labeled data 64C obtained by estimating (labeling) the number of oshiboris of the image data for learning 62, the corrected image data for estimation 64A, and uncorrected image data for estimation 64B, which is the image data for estimation 64 photographed so far and is not corrected in the number of oshiboris with the primary deep learning model 66.

In general, as the number of image data to be learned is larger, a more highly accurate learning model can be created. However, the uncorrected image data for estimation 64B not corrected in the number of oshiboris should not be used as it is as the image data for learning. This is because it cannot be discriminated whether the information concerning the estimated number of oshiboris included in the uncorrected image data for estimation 64B is an actual number of oshiboris or an approximate number of oshiboris (a correct label). However, in order to label the uncorrected image data for estimation 64B with the primary deep learning model 66 with higher accuracy than an initial learning model (a learning model learned using only the image data for learning 62), the number of pieces of the estimated oshiboris of the labeled data 64C is closer to the correct label than that of the uncorrected image data for estimation 64B. The standard learning model (secondary deep learning model) 61 based on the image data for learning 62, the corrected image data for estimation 64A, and the labeled data 64C has more image data to be learned than the primary deep learning model 66 based on the image data for learning 62 and the corrected image data for estimation 64A. Therefore, a degree of perfection is high and the accuracy of estimating the number of oshiboris is also improved. In addition, since the image data for estimation 64 includes noise specific to the oshibori collecting place, for example, a reflection of the ground on which the collection box is placed and a reflection of a shadow compared with the image data for learning 62, it is possible to acquire, from the image data for estimation 64, a parameter that cannot be acquired from the image data for learning 62.

The first-type learning model (second-type learning model) is a learning model created by diverting (fine tuning) the same parameter as the parameter of the standard learning model 61 in a shallow layer (the input layer and the intermediate layer close to the input layer) where feature extraction (image analysis) of an image is performed and performing learning using the image data for learning of the oshiboris C (oshiboris D) in a deep layer (the intermediate layer close to the output layer and the output layer) where estimation of the number of oshiboris is performed. The demand for the oshiboris C (oshiboris D) is smaller compared with the demand for the oshiboris A and the image data for learning and the image data for estimation of the oshiboris C (oshiboris D) are smaller than those of the oshiboris A. Therefore, when a model is created using the image data for learning and the image data for estimation of the oshiboris C (oshiboris D), the feature extraction of the image cannot be accurately performed because there are few image data to be learned. A highly accurate learning model cannot be created. However, since the first-type learning model (second-type learning model) diverts (fine-tunes) the parameter of the standard learning model 61 having a large number of data, it is possible to create a highly accurate model even for the oshiboris C (oshiboris D) having less data to be learned.

Figure 10:
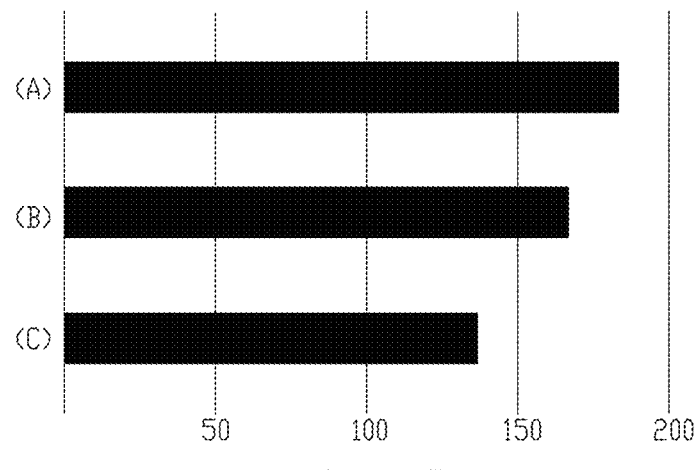
FIG. 10 is a graph illustrating a mean square error between a correct answer label and an estimation result of a first-type learning model according to the second embodiment.

FIG. 10 is a graph illustrating a correct answer label of the first-type learning model and a mean square error of an estimated number of oshiboris. (A) is a first-type learning model learned from the beginning using the image data for learning of the oshiboris B, (B) is a learning model created by finely tuning a parameter of a learned model publicly available in a shallow layer and performing learning using the image data for learning of the oshiboris C in a deep layer, and (C) is a learning model created by finely tuning a parameter of the standard learning model 61 in a shallow layer and performing learning using the image data for learning of the oshiboris C in a deep layer. As illustrated in FIG. 10, in (C), an error between the correct answer label and the estimated number of oshiboris is clearly smaller compared with (A) and (B) and a highly accurate learning model can be created by fine-tuning a parameter of a model having a larger number of data in a shallow layer.

The Cloud server 4 according to the second embodiment includes a color correcting unit. The color correcting unit detects a color of the image for estimation photographed by the photographing unit 14 of the smartphone 2a, that is, the number of bytes of RGB colors formed by 3 bytes (R.G.B), and corrects the color of the image for estimation before the number of used oshiboris is estimated. A color of the collection box in the image for estimation acquired by the acquiring unit 29 of the Cloud server 4 after being photographed by the photographing unit 14 is corrected to a color (a standard color) of the collection box in the image for learning or an approximate color of the color used when the standard learning model 61, the first-type learning model, and the second-type learning model are created. When the number of bytes of the color of the collection box in the image for estimation is represented as X.Y.Z and the color (the standard color) of the collection box in the image for learning is represented as R1.G1.B1, color conversion is performed by replacing (1) byte arrays of R.G.B=X.Y.Z with (2) R.B.G=X.Y.Z, (3) G.R.B=X.Y.Z, (4) G.B.R=X.Y.Z, (5) B.R.G=X.Y.Z, and (6) B.G.R=X.Y.Z and the most approximate value (X.Y.Z≈R1.G1.B1) is selected out of (1) to (6). In the present embodiment, since the colors of the oshiboris A to D are white (255,255,255), the colors of the oshiboris A to D do not change even when color conversion is performed.

Figure 11:
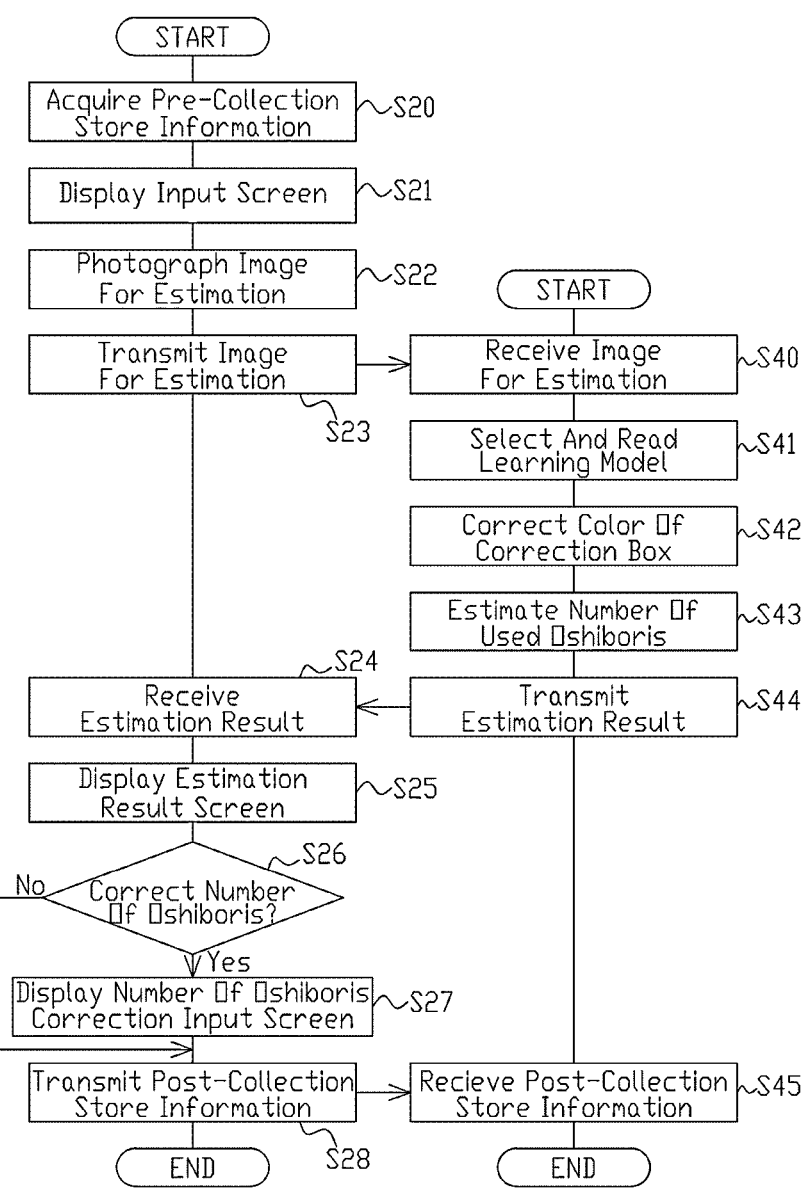
FIG. 11 is a flowchart explaining processing executed by the oshibori management system according to the second embodiment in order to estimate the number of used oshiboris stored in a collection box.

Next, a number of oshiboris estimating method for estimating the number of used oshiboris stored in a collection box using the oshibori management system according to the second embodiment is explained with reference to the drawings. FIG. 11 is a flowchart for explaining processing executed by the oshibori management system in order to estimate the number of used oshiboris stored in the collection box.

First, the control unit 10 of the smartphone 2a acquires pre-collection store information (step S20). Since the processing in step S20 is the same as the processing in step S10 illustrated in FIG. 6, explanation of the processing is omitted. Next, the display control unit 34 of the control unit 10 causes the display unit 18 to display the screen 18d illustrated in FIG. 7 (step S21). Then, the control unit 10 checks the store code input via the input unit 12 and reads a type of oshiboris linked with the store code (a type of oshiboris contracted with the store) from the store information 24. In FIG. 7, a case is illustrated in which the oshiboris A contracted with the store having the store code "XXXX" are selected.

Next, the photographing control unit 31 of the control unit 10 confirms that the outer frame of the collection box is fit in a predetermined position in the live view image 58 (the outer frame of the live view image 58 in the present embodiment) and then causes the photographing unit 14 to photograph an image for estimation (step S22). Next, the control unit 10 transmits the type of oshiboris input by the input unit 12 and the image for estimation photographed in step S22 to the Cloud server 4 via the communication unit 20 (step S23).

After the control unit 36 of the Cloud server 4 receives the type of the oshiboris and the image for estimation from the smartphone 2a via the communication unit 40 (step S40), the control unit 36 causes the acquiring unit 29 to acquire these. Next, the control unit 36 selects, based on the type of oshiboris, a learning model to be used for estimating the number of used oshiboris and reads the selected learning model (step S41). The control unit 36 reads the standard learning model 61 when the oshiboris A are selected, reads the standard learning model 61 and the correction coefficient when the oshiboris B are selected, reads the first-type learning model when the oshiboris C are selected, and reads the second-type learning model when the oshiboris D are selected.

Next, the control unit 36 corrects the color of the collection box appearing in the image for estimation photographed in step S22 (step S42). The control unit 36 detects the number of bytes of RGB colors formed by 3 bytes (R.G.B) of the image for estimation in the color correcting unit and performs color conversion by replacing the byte arrays of R.G.B. Then, the control unit 36 selects, out of converted six colors, a color closest to the color (the standard color) of the collection box in the image for learning used when creating the standard learning model 61, the first-type learning model, and the second-type learning model.

Next, the estimating unit 32 of the control unit 36 estimates the number of used oshiboris (step S43). When a type of oshiboris is "oshiboris A", the estimating unit 32 estimates the number of used oshiboris using the standard learning model 61. When the type of the oshiboris is "oshiboris B", the estimating unit 32 estimates the number of used oshiboris using the first learning model 22 and then corrects the number of used oshiboris by multiplying an estimation result by the correction coefficient of the oshiboris B. When the type of the oshiboris is "oshiboris C", the estimating unit 32 estimates the number of used oshiboris using the first-type learning model. When the type of the oshiboris is "oshiboris D", the estimating unit 32 estimates the number of used oshiboris using the second-type learning model. Since specific processing is the same as the processing in step S31 illustrated in FIG. 6, explanation of the specific processing is omitted.

When finishing the estimation of the number of used oshiboris, the control unit 36 transmits the estimated number of oshiboris result estimated in step S43 to the smartphone 2a via the communication unit 40 (step S44).

After the control unit 10 of the smartphone 2a receives the estimation result of the number of used oshiboris estimated in step S43 to the Cloud server 4 via the communication unit 20 (step S24), the control unit 10 causes the display unit 18 to display the collection registration screen 18e illustrated in FIG. 8 via the display control unit 34 (step S25). Next, the control unit 10 discriminates whether the number of oshiboris correction button is pressed by the deliverer via the input unit 12 (step S26). When it is discriminated in step S26 that the number of oshiboris correction button is pressed (step S26: Yes), the control unit 10 causes the display unit 18 to display a not-illustrated number of oshiboris correction input screen via the display control unit 34 (step S27). Then, the control unit 10 acquires a corrected number of used oshiboris (the number of corrected oshiboris of an estimation result) input by the deliverer via the input unit 12 and adds the input number of oshiboris to the post-collection store information as a corrected number of oshiboris result (a correct answer label). Then, when confirming an input of the OK button from the deliverer via the input unit 12, the display control unit 34 of the control unit 10 causes the display unit 18 to display the delivery registration screen 18*c* illustrated in FIG. 5 and proceeds to processing in step S28.

On the other hand, when the number of oshiboris correction button is not pressed and the OK button is pressed in step S26 (step S26: No), the display control unit 34 of the control unit 10 causes the display unit 18 to display the delivery registration screen 18*c* illustrated in FIG. 5 and proceeds to the processing in step S28. Since the specific processing is the same as the processing in step S18 illustrated in FIG. 6, explanation of the specific processing is omitted.

After the control unit 36 of the Cloud server 4 receives the post-collection store information added the estimation result the corrected number of oshiboris result, the corrected number result of oshiboris, the number of oshiboris to be delivered and the like from the smartphone 2*a* via the communication unit 40, the control unit 36 causes the data storing unit 38 to store these (step S45).

The processing illustrated in the flowchart of FIG. 11 is performed on all stores included in the delivery course. Instead of being performed for each of the stores, in the processing of steps S18 and S33, at first, the post-collection store information may be stored in the data storing unit 16 of the smartphone 2*a*. Then the post-collection store information of several stores may be collectively transmitted to the Cloud server 4. The core system 6 receives the post-collection store information from the Cloud server 4 according to necessity and updates the store information 54 in the data storing unit 48.

With the oshibori management system according to the second embodiment, it is possible to quickly estimate the number of collected used oshiboris without counting the used oshiboris one by one. Then, by managing the number of used oshiboris for each store, it is possible to appropriately manage a contracted number of oshiboris, the number of additional oshiboris involved in seasonal variations, the number of collected oshiboris, the number of lost oshiboris, the number of oshiboris in stock in the store, and the like.

Using the system for the estimation of the number of oshiboris included to the Cloud server 4 according to the second embodiment, even a deliverer inexperienced in collecting used oshiboris can easily estimate the number of used oshiboris. Even when various deliverers collect oshiboris, it is possible to evenly estimate the number of used oshiboris.

In addition, with the Cloud server 4 according to the second embodiment, since the standard learning model 61, which is the secondary deep learning model, is used, it is possible to accurately estimate the number of used oshiboris. In addition, in the first-type learning model and the second-type learning model of the oshiboris C and D having less image data for learning and image data for estimation, a parameter of the standard learning model 61 having a large number of data are fine-tuned. Therefore, a highly accurate learning model can be created.

With the Cloud server 4 according to the second embodiment, since the Cloud server 4 include the color correcting unit, when the color of the collection box of the image for learning used for the learning model creation and the color of the collection box of the image for estimation photographed by the photographing unit 14 are different, the color of the collection box of the image for estimation can be easily approximated to the color of the collection box of the image for learning. Therefore, it is possible to suppress a decrease in accuracy of the estimated number of used oshiboris due to a difference in the color of the collection box.

In the Cloud server 4 according to the second embodiment, the Cloud server 4 include the color correcting unit and performs the processing for approximating the color of the collection box of the image for estimation to the color of the collection box of the image for learning. However, the Cloud server 4 may not include the color correcting unit and may be implemented with a learning model created for each of six types obtained by replacing the byte arrays of RGB. In this case, the color of the collection box of the image for estimation is detected and an optimal learning model is selected based on a detection result. Further, in the second embodiment, the Cloud server 4 includes the color correcting unit, but the smartphones 2*a* to 2*c* may include the color correcting unit. In this case, at first, the color of the collection box of the image for estimation is corrected in the smartphones 2*a* to 2*c*. Then, the image for estimation after correcting color is sent from the smartphones 2*a* to 2*c* to the Cloud server 4.

REFERENCE SIGNS LIST

1: Oshibori management system, 2*a* to 2*c*: Smartphone, 4: Cloud server, 6: Core system, 8: Network, 10: Control unit (Controller), 12: Input unit, 14: Photographing unit, 16: Data storing unit, 18: Display unit, 20: Communication unit, 22: First learning model, 23: Second learning model, 24: Store information, 26: Correction coefficient, 29: Acquiring unit, 30: Acquiring unit, 31: Photographing control unit (Photographing controller), 32: Estimating unit, 33: Detecting unit, 34: Display control unit (Display controller), 35: Arithmetic operation unit, 36: Control unit (Controller), 38: Data storing unit, 40: Communication unit, 42: Control unit (Controller), 44: Input unit, 46: Display unit, 48: Data storing unit, 50: Communication unit, 52: Delivery course information, 54: Store information, 56: Oshibori information, 61: Standard learning model, 62: Image data for learning, 64: Image data for estimation, 64A: Corrected image data, 64B: Uncorrected image data for estimation, 66: Primary deep learning model

The invention claimed is:

1. A server comprising:
a learning model storing unit that stores a learning model learned by a neural network with an image for learning as an input value and the number of used oshiboris as an output value, the image for learning of the used oshiboris stored in a collection box photographed;
a receiving unit that receives an image for estimation photographed by a portable terminal;
an estimating unit that estimates the number of used oshiboris from the image for estimation received by the receiving unit, with the learning model stored in the learning model storing unit, by the neural network; and
a transmitting unit that transmits an estimation result estimated by the estimating unit toward the portable terminal.

2. The server according to claim 1, further comprising:
a corrected number acquiring unit that acquires a corrected number correcting the number of used oshiboris in the estimation result, wherein
the learning model is a secondary deep learning model being deep-learned by the neural network with the image for learning, a corrected image for estimation and an uncorrected image for estimation as the input value, the uncorrected image for estimation estimated with a primary deep learning model, the corrected image for estimation being an image for estimation photographed in the past with an estimation result that is corrected, the uncorrected image for estimation being an image for estimation photographed in the past with an estimation result that is not corrected, and the number of used oshiboris in the uncorrected image for estimation being estimated with the primary deep learning model deep-learned by the neural network with the image for learning and the corrected image for estimation as the input value.

3. The server according to claim 1, wherein the learning model storing unit stores the learning model learned with the image for learning with image data outside an outer frame of the collection box deleted, and the estimating unit estimates the number of used oshiboris with the image for estimation with the image data outside the outer frame of the collection box deleted.

4. The server according to claim 1, further comprising:

a color correcting unit that corrects a color of the collection box appearing in the image for estimation to a color of the collection box appearing in the image for learning or an approximate color of the color of the collection box appearing in the image for learning.

5. The server according to claim 1, further comprising:

a density detecting unit that detects density of the used oshiboris in the collection box based on the image for estimation, wherein the estimating unit estimates the number of used oshiboris using the density detected by the density detecting unit.

6. The server according to claim 1, further comprising:

a density acquiring unit that acquires whether density of the used oshiboris in the collection box is higher than predetermined density, wherein the estimating unit estimates the number of used oshiboris using a result acquired by the density acquiring unit.

7. The server according to claim 1, further comprising:

an arithmetic operation unit that performs an arithmetic operation concerning the number of used oshiboris, wherein the receiving unit receives a plurality of images for estimation, the estimating unit respectively estimates numbers of used oshiboris in the images for estimation, and the arithmetic operation unit calculates an average of a plurality of estimation results estimated by the estimating unit.

8. The server according to claim 7, further comprising:

an abnormal value detecting unit that detects an abnormal value in the estimation results, wherein the arithmetic operation unit calculates the average of the estimation results excluding the abnormal value detected by the abnormal value detecting unit.

9. The server according to claim 1, wherein the learning model storing unit stores the learning model incorporating a parameter for estimating the number of used oshiboris from an extracted contour of an outer edge of a used oshibori group with respect to an extracted outer frame of the collection box, the extracted outer frame of the collection box and the extracted contour of the outer edge of the used oshibori group being extracted from the image for learning, the used oshibori group being stored in the collection box.

10. The server according to claim 1, further comprising:

a type acquiring unit that acquires a type of oshibori; and a correction coefficient storing unit that stores a correction coefficient based on weight of the oshibori set for each type of oshibori, wherein the estimating unit acquires the correction coefficient of the type of oshibori acquired by the type acquiring unit from the correction coefficient storing unit and corrects the number of used oshiboris using the acquired correction coefficient.

11. A server comprising:

a learning model storing unit that stores a learning model learned by a neural network with an image for learning as an input value and the number of second used oshiboris stored in a collection box as an output value, the image for learning of first used oshiboris stored in the collection box photographed, the second used oshiboris being different from the first used oshiboris;

a receiving unit that receives an image for estimation of the first used oshiboris stored in the collection box photographed with a portable terminal;

an estimating unit that estimates the number of first used oshiboris from the image for estimation received by the receiving unit, with the learning model stored in the learning model storing unit, by the neural network; and a transmitting unit that transmits an estimation result estimated by the estimating unit toward the portable terminal.

12. An oshibori management system comprising a portable terminal, the server according to claim 1 and a core system, wherein the portable terminal includes:

a first information receiving unit that receives pre-collection store information from the core system, the pre-collection store information including a store to which oshiboris are delivered, a type of the oshiboris used by the store, a number of the oshiboris delivered to the store, a number of the oshiboris collected from the store, and a number of the oshiboris in stock at the store; and a first information transmitting unit that transmits post-collection store information added the estimation result to the pre-collection store information received by the first information receiving unit to the core system;

the core system includes:

an information storing unit that stores pre-collection store information;

a second transmitting unit that transmits the pre-collection store information stored in the information storing unit to the portable terminal;

a second information receiving unit that receives the post-collection store information transmitted from the portable terminal; and an update unit that updates the pre-collection store information by causing the information storing unit to store the post-collection store information received from the second information receiving unit.

* * * * *